United States Patent
Iossifidis et al.

(10) Patent No.: US 9,981,748 B2
(45) Date of Patent: May 29, 2018

(54) FORWARD TRANSLATING HEADREST

(71) Applicant: B/E Aerospace, Inc., Wellington, FL (US)

(72) Inventors: John Iossifidis, Miami, FL (US); Moises Perez, Miami, FL (US)

(73) Assignee: B/E Aerospace, Inc., Winston-Salem, NC (US)

( * ) Notice: Subject to any disclaimer, the term of this patent is extended or adjusted under 35 U.S.C. 154(b) by 0 days. days.

(21) Appl. No.: 15/365,076

(22) Filed: Nov. 30, 2016

(65) Prior Publication Data

US 2017/0152049 A1 Jun. 1, 2017

Related U.S. Application Data

(60) Provisional application No. 62/260,946, filed on Nov. 30, 2015.

(51) Int. Cl.
*B60N 2/48* (2006.01)
*B64D 11/06* (2006.01)

(52) U.S. Cl.
CPC ........ *B64D 11/0642* (2014.12); *B60N 2/4811* (2013.01); *B60N 2/4864* (2013.01); *B60N 2/4882* (2013.01); *B60N 2002/4888* (2013.01)

(58) Field of Classification Search
CPC .......... B64D 11/0642; B60N 2/4811; B60N 2/4864; B60N 2/4882; B60N 2002/4888
USPC .......... 297/216.12, 391, 404, 408, 409, 410
See application file for complete search history.

(56) References Cited

U.S. PATENT DOCUMENTS

| 4,191,422 | A  | * | 3/1980 | Inasawa | A47C 7/38 297/391 |
| 4,762,367 | A  | * | 8/1988 | Denton | B60N 2/4838 297/409 X |
| 6,079,776 | A  | * | 6/2000 | Breitner | B60N 2/4838 297/216.12 |
| 6,688,697 | B2 | * | 2/2004 | Baumann | B60N 2/4864 297/216.12 |
| 6,715,829 | B2 | * | 4/2004 | Svantesson | B60N 2/4864 297/216.12 |
| 7,871,129 | B2 | * | 1/2011 | Boes | B60N 2/4814 297/404 |
| 8,047,606 | B2 | * | 11/2011 | Matsui | B60N 2/4885 297/216.12 |
| 8,424,965 | B2 | * | 4/2013 | Sasaki | B60N 2/4885 297/216.12 |

(Continued)

FOREIGN PATENT DOCUMENTS

WO WO2013081404 A1 6/2013
WO WO2013154269 A1 10/2013

OTHER PUBLICATIONS

International Search Report for International Application No. PCT/US2016/064165 (12 pages.) dated Feb. 20, 2017.

*Primary Examiner* — Rodney B White
(74) *Attorney, Agent, or Firm* — Clements Bernard Walker PLLC (57) ABSTRACT

A forward translating headrest equipped with a ring brake assembly configured to lock a position of a headrest plate relative to a headrest base. A ring brake is disposed between spaced first and second magnets such that first and second reset plates push the ring brake in a direction of one of the first and second magnets to reset the ring brake assembly at both ends of the stroke to the free the shaft.

8 Claims, 9 Drawing Sheets

(56) References Cited

U.S. PATENT DOCUMENTS

| | | | | |
|---|---|---|---|---|
| 8,657,378 B2* | 2/2014 | Kunert | ................ | B60N 2/4814 |
| | | | | 297/409 X |
| 8,882,193 B2* | 11/2014 | Frose | ................... | B60N 2/4885 |
| | | | | 297/216.12 |
| 8,950,815 B2* | 2/2015 | Wang | .................. | B60N 2/4864 |
| | | | | 297/409 X |
| 9,555,727 B2 | 1/2017 | Kotz | | |
| 2005/0121963 A1* | 6/2005 | Williamson | ....... | B60N 2/01508 |
| | | | | 297/408 |
| 2006/0071518 A1* | 4/2006 | Hippel | ................. | B60N 2/4852 |
| | | | | 297/216.12 |
| 2007/0246989 A1* | 10/2007 | Brockman | ........... | B60N 2/4864 |
| | | | | 297/409 X |
| 2009/0121526 A1* | 5/2009 | Akaike | ................. | B60N 2/002 |
| | | | | 297/216.12 |
| 2011/0233974 A1* | 9/2011 | Yamaguchi | .......... | B60N 2/0276 |
| | | | | 297/216.12 |
| 2012/0025586 A1* | 2/2012 | Legras | ................ | B60N 2/2255 |
| | | | | 297/463.1 |
| 2014/0001811 A1 | 1/2014 | Haeske et al. | | |
| 2014/0210243 A1 | 7/2014 | Humer | | |
| 2015/0291068 A1* | 10/2015 | Stemmer | ............. | B60N 2/1685 |
| | | | | 297/463.1 |

* cited by examiner

FORWARD TRANSLATING HEADREST

CROSS-REFERENCE TO RELATED APPLICATION

This application claims priority from U.S. application No. 62/260,946 filed Nov. 30, 2015, the entirety of which is incorporated by reference herein.

TECHNICAL FIELD AND BACKGROUND OF THE INVENTION

The present invention relates generally to an adjustable forward translating headrest for a passenger seat, and more particularly, to a mechanically operated headrest configured with a ring brake mechanism providing infinite adjustability in the given amount of stroke.

Passenger seats, such as airliner passenger seats, are typically configured with headrests to enhance safety and comfort. While most headrests are merely a fixed vertical extension of the seatback, and therefore lack independent adjustability, some seats are configured with headrests capable of adjusting relative to their supporting seatback.

Adjustable headrests can be pivotally attached along a bottom edge thereof to a top edge of the seatback, thereby allowing the angle defined between the headrest and seatback to be changed. Adjustable headrests can also be configured to raise or lower relative to their supporting seatback to accommodate passengers of varying heights. In either adjustable headrest configuration, such headrest assemblies typically utilize one or more of buttons, levers, cabling and actuators for adjustment, each of which adds to seat complexity, weight, and cost. Further, no prior art headrest assemblies are capable of forward translation independent of rotation.

Therefore, to provide headrest movement different from that of pivoting and vertically adjustable headrests, the present invention provides a forward translating headrest wherein horizontal movement is separate from rotational movement, when so equipped. The headrest assembly of the present invention further operates without buttons, levers, cabling and actuators, thereby providing a simple mechanical assembly in a compact package ideal for airliner applications.

BRIEF SUMMARY OF THE INVENTION

It is therefore an object of the invention to provide a forward translating headrest compatible with various seat designs, such as an airliner passenger seat.

It is another object of the invention to provide a forward translating headrest equipped with a mechanical brake for locking a position of the headrest relative to a fixed base.

It is a further object of the invention to provide a locking assembly for a seat headrest which can be reset manually by pulling on the headrest.

To achieve the foregoing and other objects and advantages, in one embodiment the present invention provides a headrest assembly including a headrest base adapted to be positioned atop a seat back, a headrest plate positioned forward of the headrest base, the headrest plate configured to translate relative to the headrest base to move the headrest plate toward or apart from the headrest base, at least one slide interconnecting the headrest plate and the headrest base, the at least one slide guiding headrest plate translation, a shaft fixed to the headrest plate and slidably received in the headrest base, the shaft having a length determining a stroke length of the headrest plate relative to the headrest base, and a ring brake assembly associated with the shaft configured to lock a position of the headrest plate relative to the headrest base.

In a further embodiment, the headrest can include left and right handles fixed to respective left and right sides of a front face of the headrest plate, the left handle extending laterally outward beyond and forward of the left side of the front face, and the right handle extending laterally outward beyond and forward of the right side of the front face.

In a further embodiment, the ring brake assembly can include a housing fixed to the headrest base, the shaft slidably received through the housing, spaced first and second magnets mounted atop the housing, a ring brake disposed between the first and second magnets and slidably disposed around the shaft, a first reset plate fixed to an end of the shaft opposite the headrest plate, and a second rest plate fixed to the headrest plate.

In a further embodiment, an inner diameter of the ring brake can be greater than an outer diameter of the shaft such that the ring brake can tilt relative to the shaft in a direction of the first magnet.

In a further embodiment, the first reset plate can contact the ring brake to move the ring brake toward the second magnet when the headrest plate is farthest from the headrest base.

In a further embodiment, the second reset plate can contact the ring brake to move the ring brake toward the first magnet when the headrest plate is nearest the headrest base.

In a further embodiment, the ring brake can be an annular washer stack including a magnetic washer disposed between a pair of non-magnetic washers.

In a further embodiment, the first reset plate can contact the housing when the headrest plate is farthest from the headrest base.

In a further embodiment, the ring brake assembly can lock a position of the headrest plate relative to the headrest base, and wherein the headrest plate can be reset from a locked position by pulling the headrest plate fully apart from the headrest base thereby causing the first reset plate to push the ring brake towards the second magnet such that the second magnet magnetically retains the ring brake, which frees the shaft from the annular washer stack thereby allowing the headrest plate to be pushed fully toward the headrest base.

In a further embodiment, the second reset plate can push the ring brake in a direction of the first magnet to be magnetically retained by the first magnet.

In a further embodiment, the annular washer stack can be disposed between the spaced first and second magnets such that the first and second reset plates can push the ring brake in a direction of one of the first and second magnets to reset the ring brake assembly at both ends of the stroke to the free the shaft.

In a further embodiment, the headrest base can be fixed atop a pair of spaced parallel posts adapted to be received in a top of a seat back of a passenger seat.

According to another embodiment, the present invention provides a headrest assembly including a headrest base, a headrest plate configured to translate relative to the headrest base, a shaft fixed to the headrest plate and slidably received in the headrest base, the shaft having a length determining a stroke length of the headrest plate relative to the headrest base, and a ring brake assembly configured to lock a position of the headrest plate relative to the headrest base. The ring brake assembly includes a housing fixed to the headrest base, the shaft slidably received through the housing, spaced first and second magnets mounted to the housing, a ring brake disposed between the first and second magnets and slidably disposed around the shaft, a first reset plate fixed to an end of the shaft opposite the headrest plate, and a second rest plate fixed to the headrest plate.

Embodiments of the invention can include one or more or any combination of the above features and configurations.

Additional features, aspects and advantages of the invention will be set forth in the detailed description which follows, and in part will be readily apparent to those skilled in the art from that description or recognized by practicing the invention as described herein. It is to be understood that both the foregoing general description and the following detailed description present various embodiments of the invention, and are intended to provide an overview or framework for understanding the nature and character of the invention as it is claimed. The accompanying drawings are included to provide a further understanding of the invention, and are incorporated in and constitute a part of this specification.

BRIEF DESCRIPTION OF THE DRAWINGS

These and other features, aspects and advantages of the present invention are better understood when the following detailed description of the invention is read with reference to the accompanying drawings, in which.

DETAILED DESCRIPTION OF THE INVENTION

The present invention will now be described more fully hereinafter with reference to the accompanying drawings in which exemplary embodiments of the invention are shown. However, the invention may be embodied in many different forms and should not be construed as limited to the representative embodiments set forth herein. The exemplary embodiments are provided so that this disclosure will be both thorough and complete, and will fully convey the scope of the invention and enable one of ordinary skill in the art to make, use and practice the invention. Like reference numbers refer to like elements throughout the various drawings.

Figure 1:
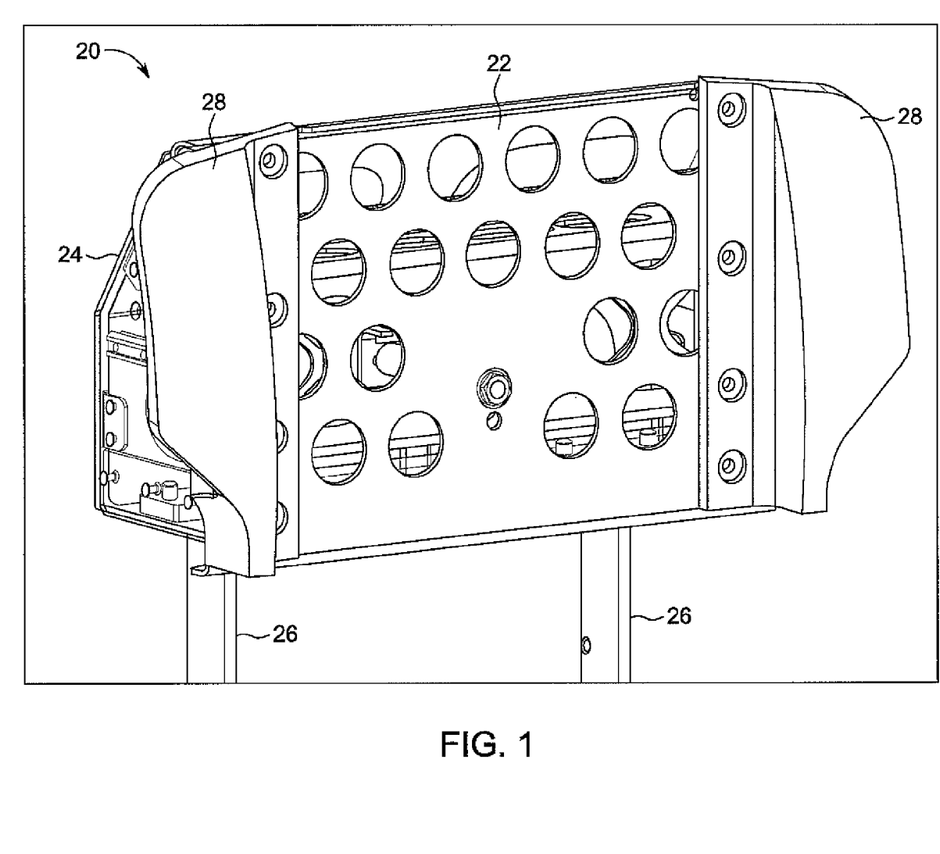
FIG. 1 is a front isometric view of a headrest assembly according to an embodiment of the invention.

FIG. 1 shows a headrest assembly generally at reference numeral 20. The headrest assembly 20 generally includes a headrest plate 22 configured to translate, for example horizontally translate, relative to a headrest base 24 to adjust a distance of the headrest plate from the headrest base 24. The headrest base 24 is mounted atop a pair of spaced parallel posts 26 configured to be received within a seat back supporting the headrest assembly 20. The parallel posts 26 may be slidably disposed within the seat back such that the headrest assembly 20 can be raised or lowered relative to the seatback independent of the translational movement of the headrest plate 22. The headrest assembly 20 is compatible with a variety of seat types, such as an airliner passenger seat.

The headrest plate 22 is generally planar and foraminous to save weight. Headrest handles 28 are attached along the left and right sides of the front face of the headrest plate 22, and are used to grab the headrest plate to slide the headrest plate forward or rearward to adjust the position of the headrest plate 22 relative to the headrest base 24. In one aspect, the headrest handles 28 can be padded and serve to center the head of the passenger on the headrest. As shown, the headrest handles 28 extend the full height of the headrest plate 22, outward beyond the left and right sides thereof, and forward of the front face of the headrest plate. Although not show, the headrest plate 22 is preferably padded and upholstered for comfort and aesthetics.

Figure 2:
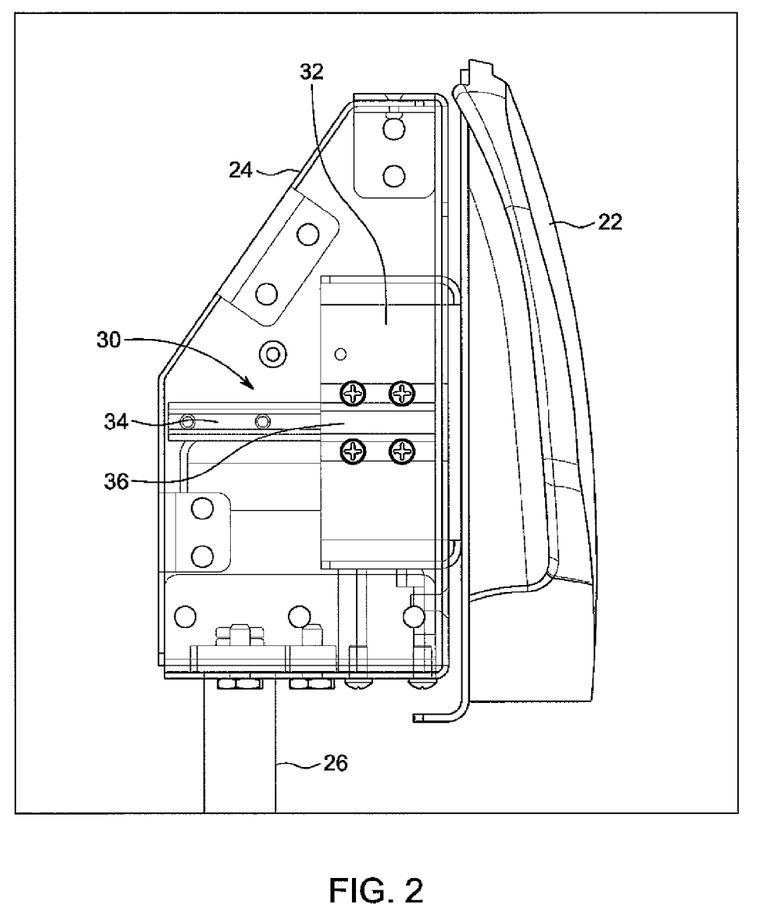
FIG. 2 is a right side view of the headrest assembly.

FIG. 2 shows the headrest plate 22 slidably attached to the headrest base 24 by way of linear slides 30 capable of facilitating translation. A generally rectangular open-faced frame member 32 is attached to the rear face of the headrest plate 22. Each of the linear slides 30 includes a rail 34 attached to one side of the frame member 32 which is slidably disposed within a guide 36 attached to the headrest base 24. In this arrangement, the spaced linear slides 30 facilitate linear movement of the headrest plate 22 relative to the headrest base 24, while maintaining squarenesss throughout the range of motion of the headrest plate 22. As shown, the rails 34 can be oriented perpendicular to the parallel posts 26 such that headrest assembly movement relative to the seatback is perpendicular to headrest plate translating movement relative to the headrest base 24.

Figure 3:
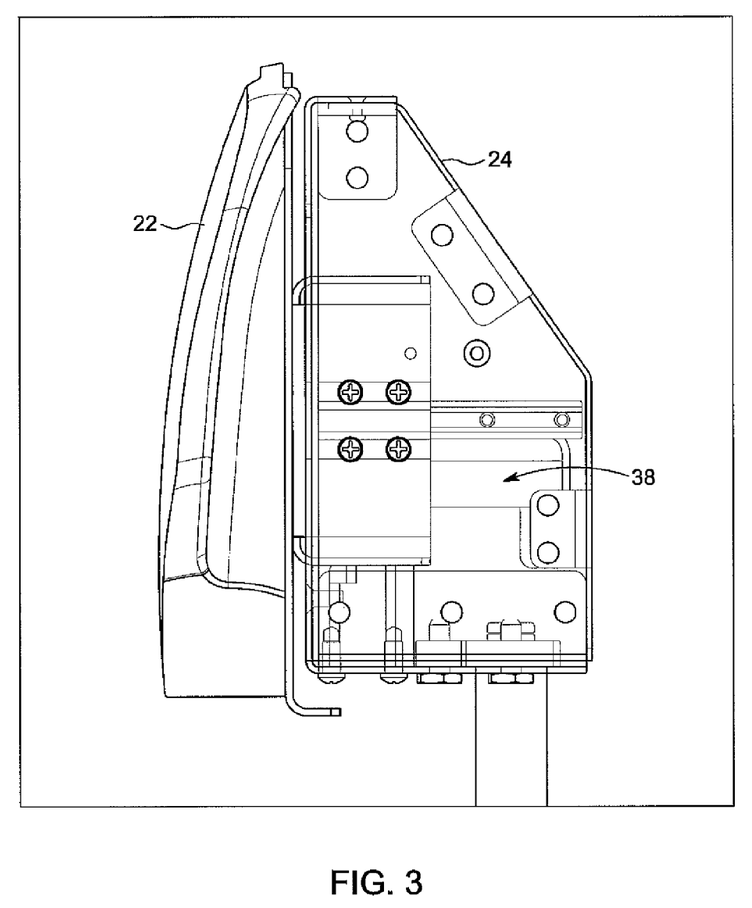
FIG. 3 is a left side view of the headrest assembly.

FIG. 3 shows the headrest plate 22 in a fully stowed position nearest the headrest base 24. In a particular embodiment, the headrest plate 22 can directly contact a front face of the headrest base 24.

Figure 4:
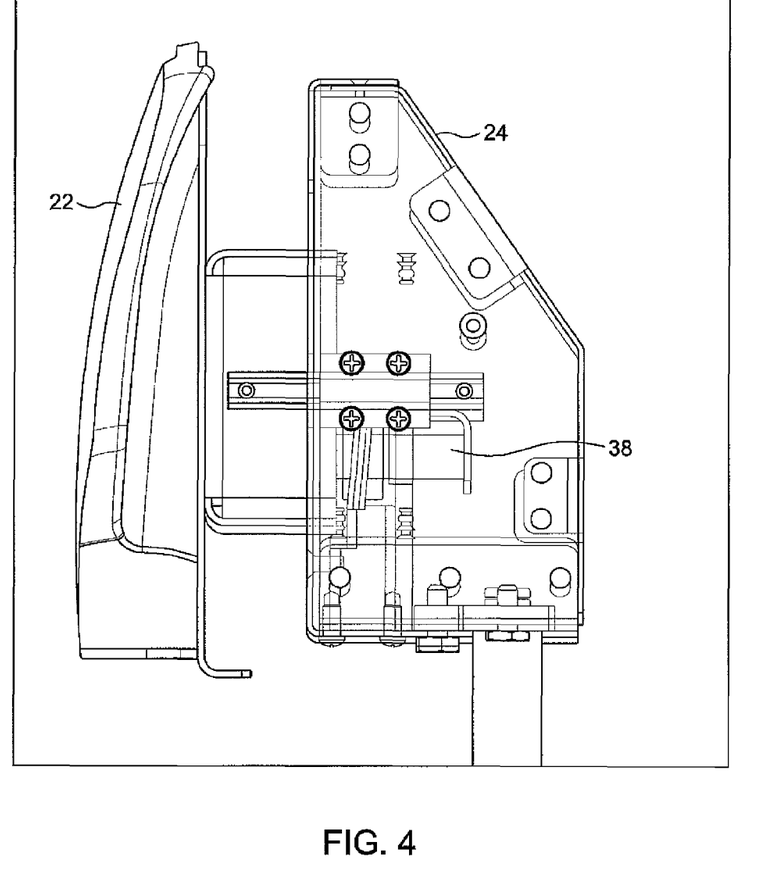
FIG. 4 shows forward headrest translation.

FIG. 4 shows forward translation of the headrest plate 22 relative to the headrest base 24. In operation, the headrest handles 28 can be pulled to slide the headrest plate 22 forward to a desired locked position. Any position can be selected along the given stroke, wherein the stroke is determined by the length of a headrest shaft 38.

Figure 5:
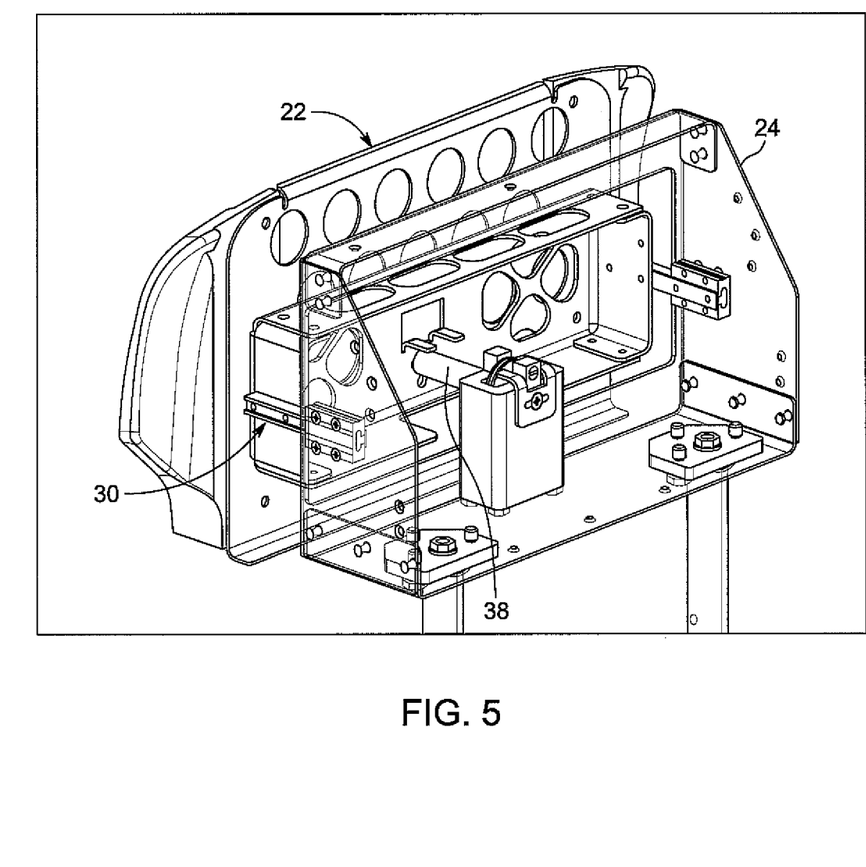
FIG. 5 is a rear isometric view of the headrest assembly.
Figure 6:
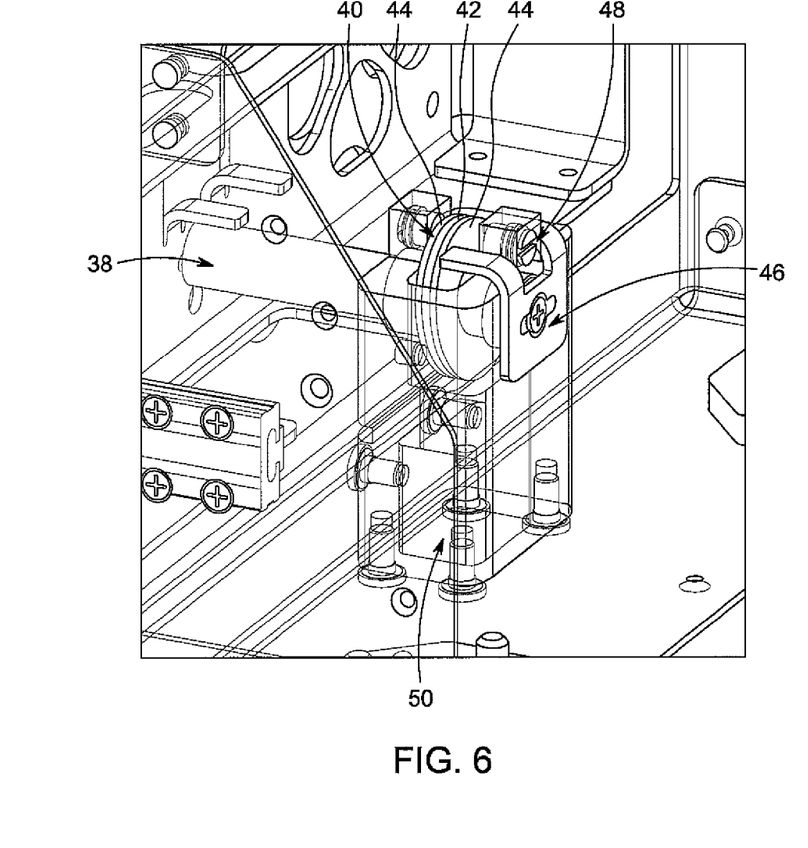
FIG. 6 is a detailed view of the ring brake assembly of the headrest.

FIGS. 5 and 6 show the headrest shaft 38 and ring brake assembly for locking the desired position of the headrest plate 22 relative to the headrest base 24. The ring brake assembly includes a ring brake 40 slidably disposed around the headrest shaft 38. In a particular embodiment, the ring brake 40 can be an annular washer stack including a magnetic washer 42 disposed between a pair of nonmagnetic washers 44. The inner diameter of the opening through the ring brake 40 is greater than the outer diameter of the headrest shaft 38, such that the ring brake 40 can change tilt relative to the shaft 38 to "open" and "close" the ring brake 40 to unlock or lock the shaft 38 along the stroke thereof.

Figure 7:
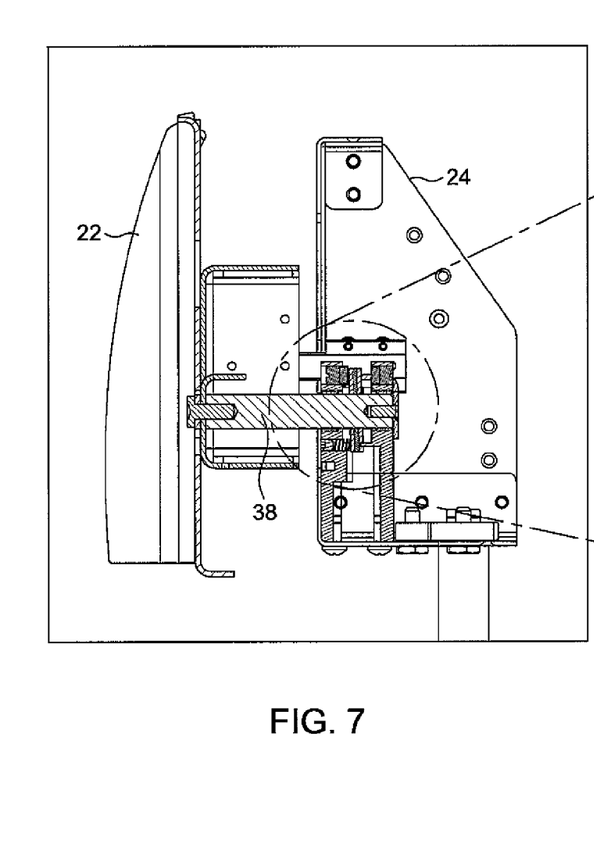
FIG. 7 is a left side view of the headrest assembly showing the ring brake assembly in an open position.
Figure 8:
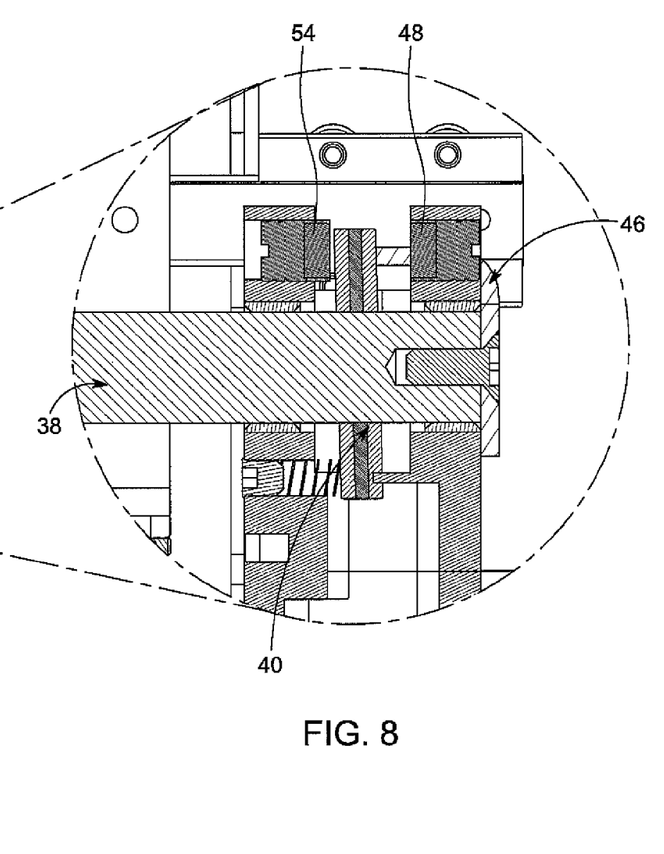
FIG. 8 is a detailed view of the ring brake assembly of FIG. 7.

To reset the headrest plate 22 from a locked position along the stroke of the shaft 38, the headrest plate 22 is pulled fully forward to the end of the stroke such that the headrest plate 22 is farthest from the headrest base 24, thereby causing a first reset plate 46 mounted on an end of the headrest shaft 38 opposite the headrest plate 22 to push the ring brake 40 toward a first magnet 48 affixed to a housing 50 attached to the headrest base 24. The first magnet 48 magnetically retains the ring brake 40, which frees the headrest shaft 38 from the ring brake assembly thereby allowing the headrest plate 22 to be pushed fully in a direction of the headrest base 24 to fully stow the headrest plate 22, as shown in FIGS. 7 and 8.

Figure 9:
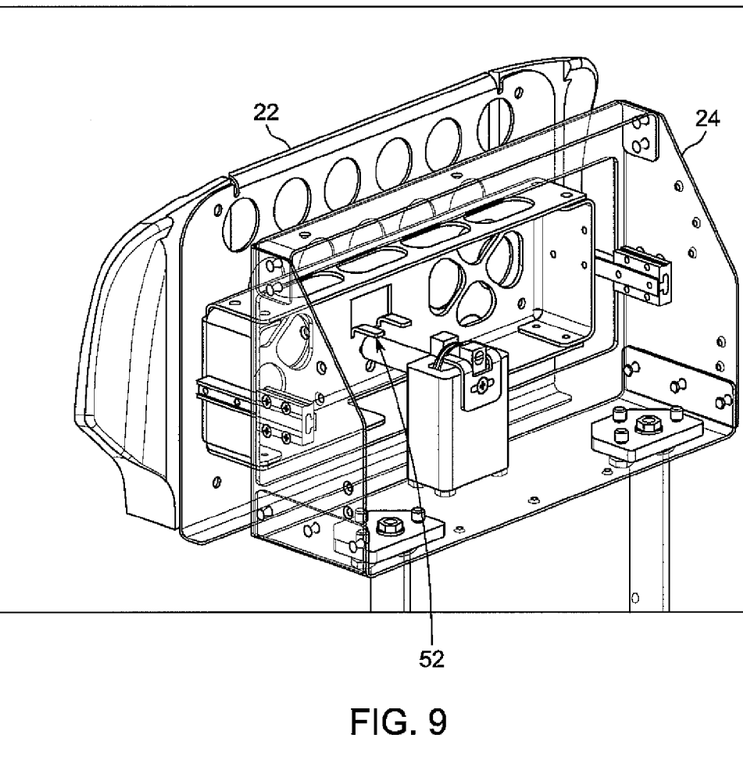
FIG. 9 is a rear isometric view of the headrest assembly showing the ring brake in a closed position.
Figure 10:
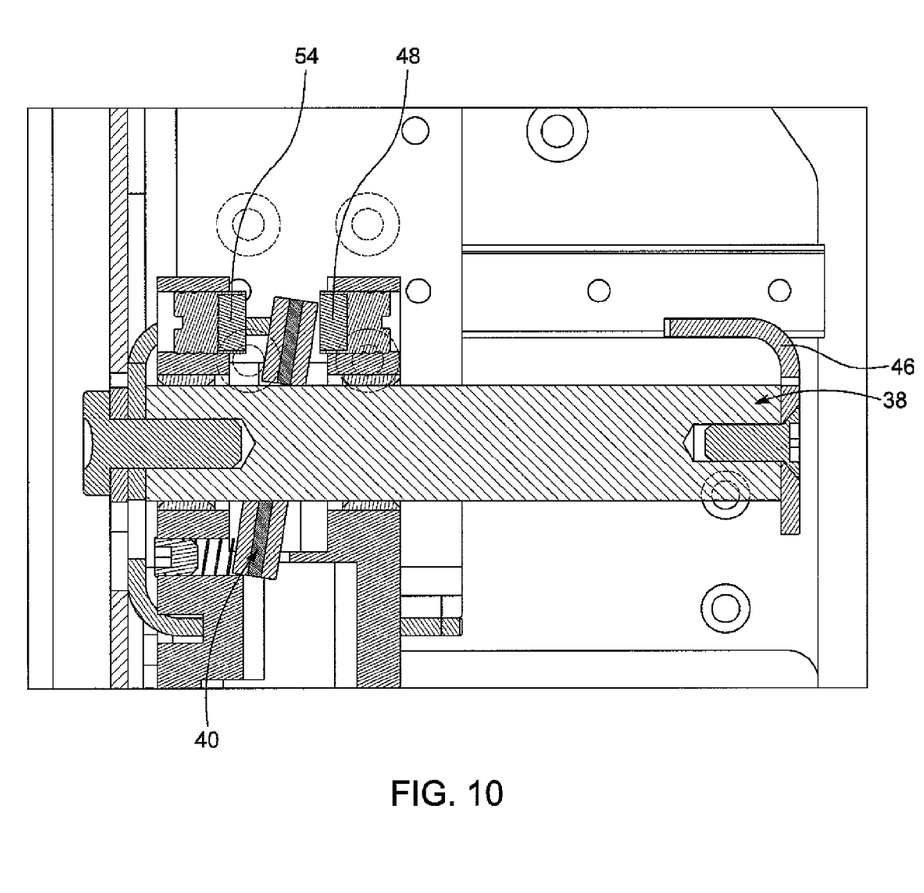
FIG. 10 is a detailed view of the ring brake assembly shown in FIG. 9.

As shown in FIGS. 9 and 10, in the fully stowed position of the headrest plate 22, a second reset plate 52 affixed to or part of a backside of the headrest plate 22 pushes on the ring brake 40, thereby causing the ring brake 40 to be magnetically retained by a second magnet 54 mounted in the housing 50 spaced from the the first magnet 48, thereby resetting the brake assembly. Once reset, the headrest plate 22 can be slid forward to be adjusted to a seat occupant's preference.

The ring brake 40 is disposed spaced between the spaced first and second magnets 48, 54 such that the first and second reset plates 46, 52 can push the ring brake 40 in a direction of one of the first and second magnets 48, 54 to reset the ring brake 40 at both ends of the stroke to the free the shaft 38. When fully stowed, the headrest plate 22 can again be pulled forward, thereby tilting the ring brake 40 relative to the shaft 38 in a direction that locks the shaft 38, thereby locking the position of the headrest plate 22 relative to the headrest base 24. The headrest plate 22 can continue to be pulled forward and locked, but cannot be pushed rearward because of the tilt of the ring brake 40 in a direction of the first magnet 48 and engaging on the headrest shaft 38. The ring brake 40 and headrest shaft 38 arrangement thus allows for locking at any position along the length of the forward stroke (i.e., movement of the headrest plate 22 away from the headrest base 24), which can be adjusted by changing the length of the headrest shaft 38. A bottom portion of the ring brake 40 can also be biased as shown in FIG. 8 to hold the ring brake 40 perpendicular to the shaft 38 to allow unrestricted full return motion to the fully stowed position of the headrest plate 22.

While the foregoing description provides embodiments of the invention by way of example only, it is envisioned that other embodiments may perform similar functions and/or achieve similar results. Any and all such equivalent embodiments and examples are within the scope of the present invention and are intended to be covered by the appended claims.

What is claimed is:

1. A headrest assembly, comprising:
    a headrest base;
    a headrest plate configured to translate relative to the headrest base;
    a shaft fixed to the headrest plate and slidably received in the headrest base, the shaft having a length determining a stroke length of the headrest plate relative to the headrest base; and
    a ring brake assembly configured to lock a position of the headrest plate relative to the headrest base, the ring brake assembly including:
    i. a housing fixed to the headrest base, the shaft slidably received through the housing;
    ii. spaced first and second magnets mounted to the housing;
    iii. a ring brake disposed between the first and second magnets and slidably disposed around the shaft;
    iv. a first reset plate fixed to an end of the shaft opposite the headrest plate; and
    v. a second rest plate fixed to the headrest plate.

2. The headrest assembly according to claim 1, wherein an inner diameter of the ring brake is greater than an outer diameter of the shaft such that the ring brake can tilt relative to the shaft in a direction of the first magnet when the headrest plate is nearest the headrest base, and is nearest the second magnet when the headrest plate is apart from the headrest base.

3. The headrest assembly according to claim 1, wherein the first reset plate contacts the ring brake to move the ring brake toward the second magnet when the headrest plate is farthest from the headrest base.

4. The headrest assembly according to claim 1, wherein the second reset plate contacts the ring brake to move the ring brake toward the first magnet when the headrest plate is nearest the headrest base.

5. The headrest assembly according to claim 1, wherein the ring brake is an annular washer stack comprising a magnetic washer disposed between a pair of non-magnetic washers.

6. The headrest assembly according to claim 1, wherein the ring brake assembly locks a position of the headrest plate relative to the headrest base, and wherein the headrest plate is reset from a locked position by pulling the headrest plate fully apart from the headrest base thereby causing the first reset plate to push the ring brake toward the second magnet such that the second magnet magnetically retains the ring brake, which frees the shaft from the ring brake thereby allowing the headrest plate to be pushed fully toward the headrest base.

7. The headrest assembly according to claim 1, wherein the ring brake is disposed between the spaced first and second magnets such that the first and second reset plates can push the ring brake in a direction of one of the first and second magnets to reset the ring brake assembly at both ends of the stroke to the free the shaft.

8. The headrest assembly according to claim 1, further comprising left and right handles fixed to respective left and right sides of a front face of the headrest plate, the left handle extending laterally outward beyond and forward of the left side of the front face, and the right handle extending laterally outward beyond and forward of the right side of the front face.

* * * * *